United States Patent
Liu et al.

(10) Patent No.: US 12,025,501 B2
(45) Date of Patent: Jul. 2, 2024

(54) THREE-DIMENSIONAL DISPLACEMENT COMPENSATION METHOD FOR MICROSCOPIC THERMOREFLECTANCE THERMOGRAPHY AND CONTROL DEVICE

(71) Applicant: THE 13TH RESEARCH INSTITUTE OF CHINA ELECTRONICS TECHNOLOGY GROUP CORPORATION, Shijiazhuang (CN)

(72) Inventors: Yan Liu, Shijiazhuang (CN); Aihua Wu, Shijiazhuang (CN); Wei Wang, Shijiazhuang (CN); Yuwei Zhai, Shijiazhuang (CN); Hao Li, Shijiazhuang (CN); Chen Ding, Shijiazhuang (CN); Xiaodong Jing, Shijiazhuang (CN); Baicheng Sheng, Shijiazhuang (CN)

(73) Assignee: The 13th Research Institute of China Electronics Technology Group Corporation, Shijiazhuang (CN)

( * ) Notice: Subject to any disclaimer, the term of this patent is extended or adjusted under 35 U.S.C. 154(b) by 253 days.

(21) Appl. No.: 17/859,845

(22) Filed: Jul. 7, 2022

(65) Prior Publication Data
US 2023/0036090 A1 Feb. 2, 2023

Related U.S. Application Data

(63) Continuation of application No. PCT/CN2022/081398, filed on Mar. 17, 2022.

(30) Foreign Application Priority Data

Jul. 14, 2021 (CN) .......................... 202110803448.7

(51) Int. Cl.
*G01J 5/48* (2022.01)
*G01J 5/00* (2022.01)
(Continued)

(52) U.S. Cl.
CPC ............... *G01J 5/48* (2013.01); *G01J 5/0806* (2013.01); *G01J 5/084* (2013.01); *G01J 2005/0077* (2013.01)

(58) Field of Classification Search
CPC .......... G01J 5/08406; G01J 5/084; G01J 5/48; G01J 2005/0077
See application file for complete search history.

(56) References Cited

U.S. PATENT DOCUMENTS

2002/0126732 A1* 9/2002 Shakouri .................. G01J 5/00
374/130
2003/0086067 A1* 5/2003 Gerstner .............. G02B 21/367
353/30
(Continued)

FOREIGN PATENT DOCUMENTS

CN 110298870 A 10/2019

*Primary Examiner* — Blake C Riddick
(74) *Attorney, Agent, or Firm* — AP3 Law Firm PLLC

(57) ABSTRACT

A three-dimensional displacement compensation method is provided. The method includes an obtaining step, a transforming step, a first determining step, a first calculating step and a compensating step. The obtaining step includes obtaining a current image of a measured element captured by a microscopic thermoreflectance thermography device. The transforming step includes two sub-steps. One sub-step uses Fourier transform to calculate a reference image to obtain a first result, and the other sub-step uses Fourier transform to calculate the current image to obtain a second result. The first determining step includes determining a peak point coordinate and a fitting diameter of a point spread function of an optical system of the device. The first calculating step includes calculating a three-dimensional displacement of the position to be compensated relative to the reference position. The compensating step compensates the position to be compensated.

18 Claims, 3 Drawing Sheets

(51) Int. Cl.
*G01J 5/08* (2022.01)
*G01J 5/0806* (2022.01)

(56) References Cited

U.S. PATENT DOCUMENTS

| | | | | |
|---|---|---|---|---|
| 2003/0201393 | A1* | 10/2003 | Tsuneta | H01J 37/26 250/311 |
| 2004/0017571 | A1* | 1/2004 | Garcia | G01N 21/171 422/91 |
| 2006/0098861 | A1* | 5/2006 | See | G01B 11/08 382/145 |
| 2006/0114965 | A1* | 6/2006 | Murphy | G01N 25/72 374/E11.003 |
| 2006/0274151 | A1* | 12/2006 | Lueerssen | G01J 5/0003 348/180 |
| 2008/0265130 | A1* | 10/2008 | Colomb | G03H 1/08 250/201.9 |
| 2009/0084959 | A1* | 4/2009 | Hudgings | G01J 5/0003 250/341.8 |
| 2013/0301676 | A1* | 11/2013 | Chang | G01J 5/0003 374/137 |
| 2015/0061279 | A1* | 3/2015 | Cruz | B42D 25/378 283/67 |
| 2017/0299440 | A1* | 10/2017 | Chang | H04N 25/673 |
| 2018/0094979 | A1* | 4/2018 | Kendig | G01J 5/025 |
| 2018/0156673 | A1* | 6/2018 | Kendig | H04N 5/30 |
| 2018/0217004 | A1* | 8/2018 | Kendig | G01J 5/0096 |
| 2022/0316959 | A1* | 10/2022 | Kakefuda | G01N 25/18 |
| 2022/0404204 | A1* | 12/2022 | Hanus | H01L 21/02568 |

* cited by examiner

THREE-DIMENSIONAL DISPLACEMENT COMPENSATION METHOD FOR MICROSCOPIC THERMOREFLECTANCE THERMOGRAPHY AND CONTROL DEVICE

CROSS-REFERENCE TO RELATED APPLICATIONS

This application is a continuation application of International Application No. PCT/CN2022/081398, filed on Mar. 17, 2022, which claims priority to Chinese Patent Application No. CN 202110803448.7, filed on Jul. 14, 2021. The disclosures of the aforementioned applications are hereby incorporated herein by reference in their entireties.

TECHNICAL FIELD

The present application relates to the technical field of microscopic temperature imaging, and in particular, to a three-dimensional displacement compensation method for microscopic thermoreflectance thermography and a control device.

BACKGROUND

Thermoreflectance temperature measurement technology is a non-contact temperature measurement technology, which is based on the phenomenon of thermoreflectance whose basic feature is that the reflectivity of an object changes with the temperature of the object. The change in reflectivity with temperature can usually be characterized by Thermoreflectance Coefficient ($C_{TR}$) or Thermoreflectance Calibration Coefficient. When measuring temperature based on thermoreflectance, in order to achieve microscopic thermography with high spatial resolution, a microscope thermoreflectance thermography device is usually constructed based on a high-performance optical microscope. The illumination system of the optical microscope provides incident light, a high-performance camera records the microscopic image, and the readings output by the camera are the measured values.

In the temperature measurement process, in order to ensure the measurement accuracy, the camera readings at the reference temperature and the camera readings at the temperature to be measured usually require multiple frames of images to be averaged which require a stable correspondence between the data on each pixel of the camera and the spatial position of the measured surface during the entire measurement process. If the correspondence is disturbed, it will affect the measurement accuracy of temperature. During the measurement process, there are several temperature changes, and there are vibrations, drifts, etc. These factors will cause a position deviation of the measured element relative to the initial position. The position deviation includes horizontal deviation and vertical deviation (i.e., vertical defocusing). Due to the low value of $C_{TR}$, a small deviation may also cause significant errors in the final temperature measurement in the parts where the image grayscale changes are steep.

In the prior art, the sub-pixel image registration method and the autofocus method can be applied to microscopic thermoreflectance thermography. The sub-pixel image registration method is used to compensate for horizontal displacement and the autofocus method is used to compensate for the vertical displacement to solve the vertical defocusing problem. However, the sub-pixel image registration needs to be done after the autofocus, i.e., firstly performing the sub-pixel image registration and then performing the autofocus. The sub-pixel image registration and the autofocus can't be performed at the same time which results in low work efficiency, and is not conducive to the realization of continuous real-time horizontal displacement compensation and vertical focusing.

SUMMARY

These and other problems are generally solved or circumvented, and technical advantages are generally achieved, by embodiments of the present application which provide a three-dimensional displacement compensation method for microscopic thermoreflectance thermography and a control device.

Technical Problems

The application provides a three-dimensional displacement compensation method for microscopic thermoreflectance thermography and a control device, and intends to solve the technical problem of, when performing microscopic thermoreflectance thermography in the prior art, low work efficiency and bad performance of realizing the continuous real-time horizontal displacement compensation and vertical focusing.

Technical Solutions

In order to achieve the above purpose, in the first aspect, the present application provides a three-dimensional displacement compensation method. This method includes an obtaining step, a transforming step, a first determining step, a first calculating step and a compensating step. In the obtaining step, it is performed that obtaining a current image of a measured element. The current image is captured by a microscopic thermoreflectance thermography device when the measured element is located at a position to be compensated. The transforming step comprises two sub-steps. One sub-step is performing Fourier transform on a reference image of the measured element to obtain a first result, and the other sub-step is performing Fourier transform on the current image of the measured element to obtain a second result. It should be noted that the reference image is captured by the microscopic thermoreflectance thermography device when the measured element is located at a reference position, and the reference position is a position of the measured element having no position deviation. In the first determining step, it is performed that determining a peak point coordinate and a fitting diameter of a point spread function of an optical system of the microscopic thermoreflectance thermography device according to the first result and the second result. In the first calculating step, it is performed that calculating a three-dimensional displacement of the position to be compensated relative to the reference position according to the peak point coordinate, the fitting diameter and imaging parameters of the optical system. In the compensating step, the position to be compensated of the measured element is compensated according to the three-dimensional displacement obtained in the first calculating step.

In the second aspect, the present application provides a control device. The control device comprises a non-transitory memory storing a computer executable program, and a processor configured to execute the program to implement the three-dimensional displacement compensation method provided by the present application.

In the third aspect, the present application provides a microscopic thermoreflectance thermography system. The system comprises a microscopic thermoreflectance thermography device, a displacement platform and the control device provided by the present application. The control device is respectively electrically connected to the microscopic thermoreflectance thermography device and the displacement platform. The microscopic thermoreflectance thermography device is used to collect current images of the measured element when the measured element is located at the position to be compensated, and to collect a reference image of the measured element when the measured element is located at the reference position. The displacement platform is used to place the measured element and move the measured element according to the three-dimensional displacement obtained by the control device executing the program, thus performing a three-dimensional displacement compensation on the measured element.

Advantageous Effects of the Disclosure

Compared with the prior art, the advantageous effects of the three-dimensional displacement compensation method provided by the present application are as follows: the method provided by the application achieves three-dimensional compensation through the following five steps: the obtaining step, the transforming step, the first determining step, the first calculating step and the compensating step; The three-dimensional displacement obtained in the first calculating step includes horizontal displacement and vertical displacement. It means that using the method provided by the present application, horizontal compensation amount and vertical compensation amount can be calculated at the same time. Further, when performing the compensating in the compensating step, the horizontal deviation and vertical deviation can be compensated at the same time. Thus, the problem of low work efficiency, when performing microscopic thermoreflectance thermography in the prior art, is solved. The method provided by the present application can effectively reduce the time-consuming of the displacement compensation process. In addition, since the three-dimensional displacement of the current image can be calculated, it is beneficial to realize continuous real-time horizontal displacement compensation and vertical focusing.

BRIEF DESCRIPTION OF THE DRAWINGS

In order to more clearly illustrate the technical solutions in the embodiments of this application, the accompanying drawings to be used in the descriptions of the embodiments or the prior art will be briefly described below. Obviously, the accompanying drawings in the following description are only some embodiments of this application, and for a person of ordinary skill in the art, without involving any inventive effort, other accompanying drawings may also be obtained according to these accompanying drawings.

DETAILED DESCRIPTION OF ILLUSTRATIVE EMBODIMENTS

Figure 1:
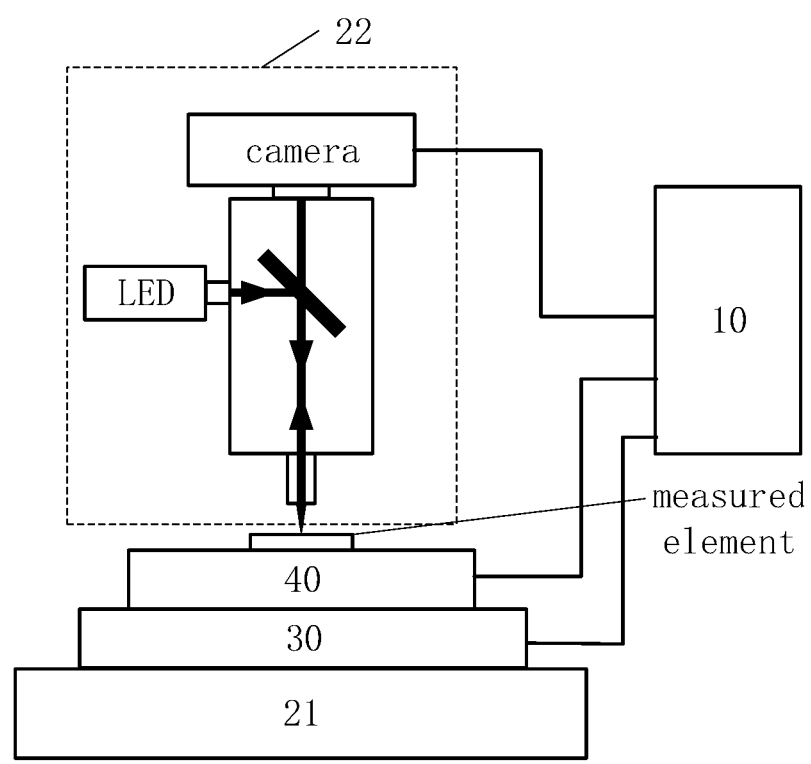
FIG. 1 is a schematic diagram of the structure and composition of the microscopic thermoreflectance thermography system according to embodiments of the present application.

In the following description, for the purpose of illustration rather than limitation, specific details such as a specific system structure and technology are set forth in order to provide a thorough understanding of the embodiments of the present application. However, it will be apparent to those skilled in the art that the present application may be practiced in other embodiments without these specific details. In other instances, detailed descriptions of well-known systems, devices, circuits, and methods are omitted so as not to obscure the description of the present application with unnecessary detail.

In order to make the objectives, technical solutions and advantages of the present application clearer, the following descriptions will be given through specific embodiments in conjunction with the accompanying drawings.

In the prior art, the change of reflectivity with temperature can be considered to be linear, so it can be characterized by a rate of change coefficient. The rate of change coefficient is usually referred to as the Thermoreflectance Coefficient ($C_{TR}$) or Thermoreflectance Calibration Coefficient. $C_{TR}$ can be formulated as:

$$C_{TR} = \frac{1}{\Delta T}\frac{\Delta R}{R}.$$

In this formula, R is the reference reflectivity, $\Delta R$ is the reflectivity change, $\Delta T$ is the temperature change.

For most metal and semiconductor materials, the range of $C_{TR}$ is usually ($10^{-2}$~$10^{-5}$) $K^{-1}$, and is related to the material, the wavelength of the incident light, and the angle of incidence. If the surface of the measured object has a multi-layer structure, the material composition of each layer and the interference of light between the multi-layer materials will also directly affect the magnitude of $C_{TR}$. The usual practice is to select the appropriate measurement wavelength for each measured sample (the difference between different measured samples is generally in the type or model), and determine $C_{TR}$. This process is often referred to as $C_{TR}$ calibration. Once the $C_{TR}$ calibration is complete, the calibrated $C_{TR}$ can be used for temperature measurement.

In the case of $C_{TR}$ being known, the temperature can be calculated according to the following formula by measuring the change in the reflectivity of the measured object:

$$T_x = T_0 + \frac{1}{C_{TR}}\left(\frac{R_x - R_0}{R_0}\right);$$

In this formula, $T_x$ is the temperature to be measured, $T_0$ is the reference temperature, $R_x$ is x the reflectivity at the temperature to be measured, and $R_0$ is the reflectivity at the reference temperature.

Since what is actually concerned is the rate of change of reflectivity $$\left(\frac{R_x - R_0}{R_0}\right),$$

a beam of probe light (incident light) can be projected onto the surface of the measured object, and then the rate of change of the reflected light intensity can be measured. The change rate of the reflectivity of the measured object can be obtained by the change rate of the reflected light intensity, so as to realize the temperature measurement. This is also the current mainstream implementation of thermoreflectance temperature measurement technology. Assuming that the intensity of the probe light is constant, the rate of change of reflectivity in the formula for calculating temperature can be equivalent to the rate of change of detector readings, that is, the formula for calculating temperature changes to:

$$T_x = T_0 + \frac{1}{C_{TR}}\left(\frac{c_x - c_0}{c_0}\right);$$

In this formula, $c_x$ is the detector reading at the temperature to be measured, and $c_0$ is the detector reading at the reference temperature.

In order to realize thermal microscopic imaging with high spatial resolution, microscope thermoreflectance thermography device is usually constructed based on high-performance optical microscope. The probe light is provided by the illumination optical system of the optical microscope, the microscopic imaging is recorded with a high-performance camera, and the output camera reading is used as the measurement value c.

Due to the low value of $C_{TR}$, in order to ensure the measurement accuracy, it is usually necessary to take the average of multiple frames of images when acquiring $c_0$ and $c_x$, and the total number of measured frames is recorded as N, so:

$$\begin{cases} T_x = T_0 + \frac{1}{C_{TR}}\left(\frac{\overline{c_x} - \overline{c_0}}{\overline{c_0}}\right) \\ \overline{c_0} = \sum_{i=1}^{N} c_0(i) \\ \overline{c_x} = \sum_{i=1}^{N} c_x(i) \end{cases}.$$

It can be seen from the above principles that during the whole measurement process, the data on each pixel of the camera must have a stable corresponding relationship with the spatial position of the surface of the measured object. If the corresponding relationship is disturbed, the accuracy of the temperature measurement results will be affected. There are several temperature changes in the measurement process, and there are factors such as vibration and drift, which will cause the position of the measured object to shift relative to the initial position, including horizontal deviation and vertical defocusing. Due to the low magnitude of $C_{TR}$, small shift may also cause significant errors in the final temperature data in the parts of the image where the grayscale changes are steep.

In the prior art, the sub-pixel image registration method and the autofocus method can be applied to microscopic thermoreflectance thermography. The sub-pixel image registration method is used to compensate for horizontal displacement and the autofocus method is used to compensate for the vertical displacement to solve the vertical defocusing problem. However, the sub-pixel image registration needs to be done after the autofocus, i.e., firstly performing the sub-pixel image registration and then performing the autofocus. The sub-pixel image registration and the autofocus can't be performed at the same time which results in low work efficiency, and is not conducive to the realization of continuous real-time horizontal displacement compensation and vertical focusing.

In order to solve the above problems, an embodiment of the present application proposes a three-dimensional displacement compensation method for microscopic thermoreflectance thermography. FIG. 1 is a schematic diagram of a microscopic thermoreflectance thermography system. FIG. 1 is also a schematic diagram of the application scenario of the compensation method. The method can be applied to but not limited to the application scenario shown in FIG. 1.

The three-dimensional displacement compensation method provided in the present application, combined with a microscopic thermoreflectance thermography device (it may be a device in the prior art), can constitute a microscopic thermoreflectance thermography system. As shown in FIG. 1, the microscopic thermoreflectance thermography system may include a microscopic thermoreflectance thermography device, a displacement platform 30. The microscopic thermoreflectance thermography device may include a control device 10, a support platform 21, an optical system 22.

The microscopic thermoreflectance thermography device is used to collect current images when a measured element is located at a position to be compensated, and to collect a reference image when the measured element is located at a reference position. The microscopic thermoreflectance thermography device and the displacement platform 30 are both electrically connected to the control device. The control device 10 obtains the current image and the reference image captured by the microscopic thermoreflectance thermography device, and after executing the program of the three-dimensional displacement compensation method provided by the embodiment of the present application, the three-dimensional displacement of the measured object is obtained. The displacement platform 30 is used to place the measured object, and move the measured object according to the three-dimensional displacement obtained by the control device 10, so as to perform three-dimensional displacement compensation to the measured object.

The displacement platform 30 and optical system 22 may be positioned above support platform 21, which provides support for optical system 22 and the displacement platform 30.

Optionally, the displacement platform 30 may be a 3-axis nano-platform, so as to compensate for the position deviation of the measured object caused by factors such as temperature changes during the temperature measurement, such as horizontal deviation and vertical defocusing mentioned above.

Optionally, the microscopic thermoreflectance thermography system may further include a temperature control stage 40. The temperature control stage 40 is located on the displacement platform 30, and the temperature control stage 40 is also electrically connected to the control device 10. The temperature control stage 40 is used for placing the measured object so as to control the temperature environment of the measured object. Exemplarily, the temperature control stage 40 may be a program-controlled heating and cooling stage.

In the microscopic thermoreflectance thermography system provided in the embodiments of the present application, since the control device 10 is a device capable of implementing the three-dimensional displacement compensation method provided by the present application, it can calculate in real time to obtain the three-dimensional displacement of the measured object relative to the reference position when it is at the current position to be compensated, so as to perform three-dimensional displacement compensation for the measured object. The three-dimensional displacement includes horizontal deviation and vertical deviation. That is to say, the system provided by the embodiments of the present application can calculate the horizontal deviation and the vertical deviation of the measured object at the same time, and simultaneously compensate the deviation of these two aspects. This avoids the problem of low work efficiency in the prior art method of first focusing to compensate for vertical deviation and then registering to compensate for horizontal deviation. The system provided by the embodiment of the present application can effectively reduce the time-consuming of the displacement compensation process. In addition, it is beneficial to realize continuous real-time horizontal displacement compensation and vertical focusing.

Figure 2:
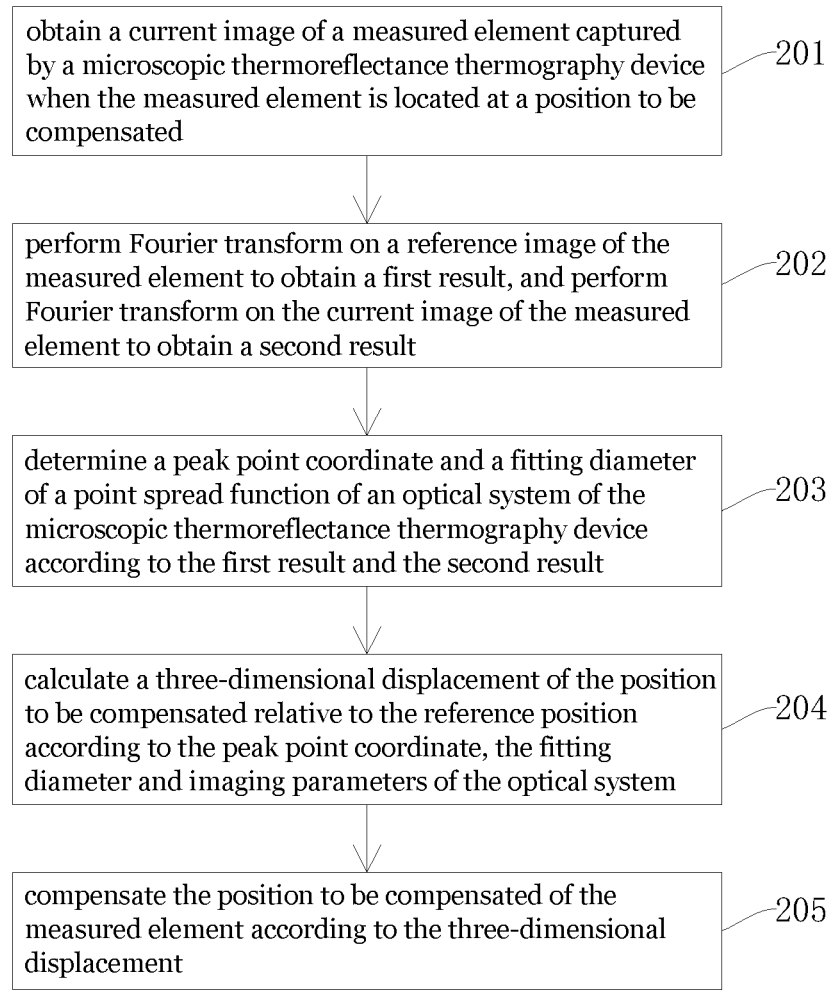
FIG. 2 is a flow diagram of the three-dimensional displacement compensation method according to embodiments of the present application.

FIG. 2 is a flow diagram of the three-dimensional displacement compensation method.

In step 201, that the method includes obtaining a current image of a measured element. captured by a microscopic thermoreflectance thermography device when the measured element is located at a position to be compensated.

In step 202, the method includes performing Fourier transform on a reference image of the measured element to obtain a first result, and performing Fourier transform on the current image of the measured element to obtain a second result.

The reference image is captured by the microscopic thermoreflectance thermography device when the measured element is located at a reference position, and the reference position is a position of the measured element having no position deviation.

The measured element can be manually focused or automatically focused, and the measured element can be adjusted to a suitable reference position. The reference image can be captured by the microscopic thermoreflectance thermography device, when the measured element is located at the reference position. When displacement compensation is required in the subsequent measurement process, the current images are all processed based on this reference image.

Optionally, the first result is obtained according to the formula $R(u,v)=\Im\{r(x,y)\}$. The $R(u,v)$ is the first result, the $r(x,y)$ represents the reference image and $\Im\{\bullet\}$ represents Fourier transform. The second result is obtained according to the formula $C(u,v)=\Im\{c(x,y)\}$. The $C(u,v)$ is the second result, the $c(x,y)$ represents the current image and $\Im\{\bullet\}$ represents Fourier transform.

Continuing to refer to FIG. 2, in step 203, that the method includes determining a peak point coordinate and a fitting diameter of a point spread function of an optical system of the microscopic thermoreflectance thermography device, according to the first result and the second result.

Optionally, the step 203 may include step 2031 and step 2032. In step 2031, obtaining the point spread function of the optical system, according to the first result and the second result. In step 2032, determining the peak point coordinate and the fitting diameter according to the point spread function.

The step 2031 may be performed according to $$p(x, y) = \Im^{-1}\left\{\frac{R(u, v)}{C(u, v)}\right\} \text{ or } p(x, y) = \Im^{-1}\left\{\frac{C(u, v)}{R(u, v)}\right\}.$$

The $p(x,y)$ is the point spread function, the $R(u,v)$ is the first result, and the $C(u,v)$ is the second result and $\Im^{-1}\{\bullet\}$ represents inverse Fourier transform.

The step 2032 may include three steps. The first step is performing a curve fitting to discrete points of the point spread function to obtain an analytical formula of a preset fitting objective function. The second step is determining unknown parameters of the analytical formula. The third step is determining the peak point coordinate and the fitting diameter according to the analytical formula with the unknown parameters being determined.

The point spread function $p(x,y)$ is an Airy disk or other approximation centered on its peak point coordinate $(x_p,y_p)$. According to the discrete points on the point spread function $p(x,y)$, an analytical formula of the Airy disk intensity profile or its approximation (such as Gauss type) is used as the analytical formula of the preset fitting objective function, and the unknown parameters of the analytical formula of the preset fitting objective function is determined. And then the peak point coordinate and fitting diameter of the fitted point spread function $p(x,y)$ is determined.

The intensity value corresponding to the diameter varies according to the definition method, such as the diameter when the peak value drops to half, the diameter when the peak value drops to 1/e, and the diameter when the peak value drops to 0 for the first time. The subsequent calculation of the three-dimensional displacement has a clear conversion relationship, which does not substantially affect the calculation result of the three-dimensional displacement.

Continuing to refer to FIG. 2, in step 204, the method includes calculating a three-dimensional displacement of the position to be compensated relative to the reference position, according to the peak point coordinate, the fitting diameter and imaging parameters of the optical system.

The three-dimensional displacement is used to compensate the position to be compensated of the measured element.

The imaging parameters includes a camera pixel size, a magnification and an objective aperture angle.

The step 204 is performed according to a formula:

$$\begin{cases} \Delta x = \dfrac{a}{m} x_p \\ \Delta y = \dfrac{a}{m} y_p \\ \Delta z = s \dfrac{da}{2m\tan\theta} \end{cases}.$$

The $\Delta x$, $\Delta y$ and $\Delta z$ is the three-dimensional displacement, $(x_p,y_p)$ is the peak point coordinate, a is the camera pixel size, and m is the magnification. The $\theta$ is half of the objective aperture angle, and when in air numerical aperture $N.A.=\sin\theta$. The d is the fitting diameter. The s is "+1" or "−1" according a defocusing direction and a Z-axis direction of the microscopic thermoreflectance thermography device. It is noted that s is "+1" when the defocusing direction is the same as the Z-axis direction, and s is "−1" when the defocusing direction is opposite to the Z-axis direction. Whether the defocusing direction is same as or opposite to the Z-axis direction can be judged manually.

Continuing to refer to FIG. 2, in step 205, the position to be compensated of the measured element is compensated according to the three-dimensional displacement obtained in the step 204.

Optionally, when compensating the position to be compensated, it may control a displacement platform of the microscopic thermoreflectance thermography device through the proportional-integral-derivative control method according to the three-dimensional displacement, to perform closed-loop displacement compensating. The proportional-integral-derivative control method is a known method. The displacement platform may be a three-axis nano displacement platform. Controlling the displacement platform may be controlling the vertical direction of the displacement platform.

Compared with the prior art, the advantageous effects of the three-dimensional displacement compensation method provided by the embodiments of the present application are as follows: the method provided by the application achieves three-dimensional compensation through step 201 to step 205. The three-dimensional displacement obtained in the step 204 includes horizontal displacement and vertical displacement. It means that using the method provided by the embodiments, horizontal compensation amount and vertical compensation amount can be calculated at the same time. Further, when performing the compensating in the compensating step, the horizontal deviation and vertical deviation can be compensated at the same time. Thus, the problem of low work efficiency, when performing microscopic thermoreflectance thermography in the prior art, is solved. The method provided by the present application can effectively reduce the time-consuming of the displacement compensation process. In addition, since the three-dimensional displacement of the current image can be calculated, it is beneficial to realize continuous real-time horizontal displacement compensation and vertical focusing.

It should be understood that the size of the sequence numbers of the steps in the above embodiments does not mean the sequence of execution, and the execution sequence of each process should be determined by its function and internal logic, and should not constitute any limitation to the implementation process of the embodiments of the present application.

The following are devices embodiments of the present application. For details that are not described in detail, reference may be made to the above-mentioned corresponding method embodiments.

An embodiment of the present application provides a three-dimensional displacement compensating device capable of implementing three-dimensional displacement compensation methods provided by the above embodiments.

Figure 3:
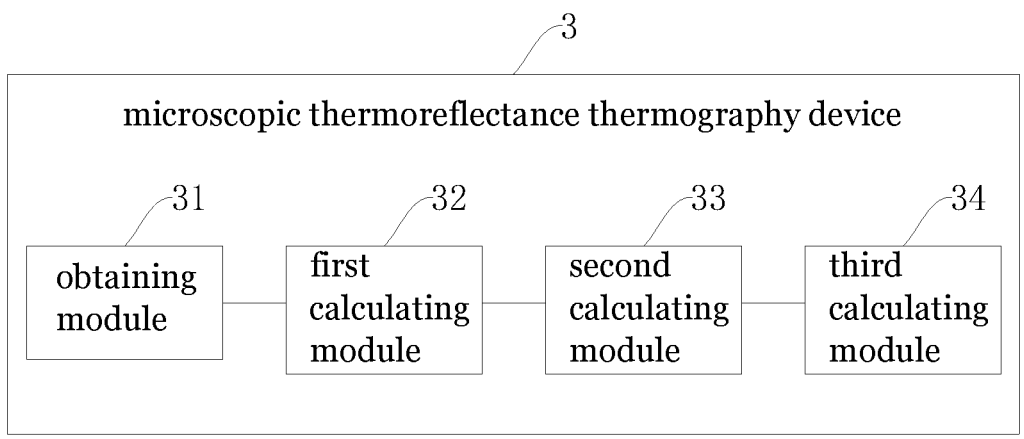
FIG. 3 is a schematic diagram of the composition of the microscopic thermoreflectance thermography device according to embodiments of the present application.

As shown in FIG. 3, the compensating device includes an obtaining module 31, a first calculating module 32, a second calculating module 33 and a third calculating module 34 that are used to perform the step 201, the step 202, the step 203, the step 204 and the step 205 respectively in the method embodiments. It is noted that the third calculating module 34 is used to perform two steps, i.e., step 204 and step 205.

Compared with the prior art, since the three-dimensional displacement compensating device provided in the embodiment of the present application can realize the three-dimensional displacement compensation method provided in the above-mentioned embodiments, it can also reduce the time-consuming of the displacement compensation process, and is conducive to the realization of continuous real-time horizontal displacement compensation and vertical focusing.

Optionally, the second calculating module 33 may perform step 2031 and step 2032 in the method embodiments.

Optionally, the second calculating module 33 may perform the step 2031 according to formula $$p(x, y) = \mathfrak{J}^{-1}\left\{\frac{R(u, v)}{C(u, v)}\right\} \text{ or } p(x, y) = \mathfrak{J}^{-1}\left\{\frac{C(u, v)}{R(u, v)}\right\}.$$

The p(x,y) is the point spread function, the R(u,v) is the first result, and the C(u,v) is the second result and $\mathfrak{J}^{-1}\{\bullet\}$ represents inverse Fourier transform.

The second calculating module 33 may perform the three steps of the step 2032 in the method embodiments.

Optionally, the third calculating module 34 may perform the step 204 according to formula:

$$\begin{cases} \Delta x = \frac{a}{m}x_p \\ \Delta y = \frac{a}{m}y_p \\ \Delta z = s\frac{da}{2m\tan\theta} \end{cases}$$

The $\Delta x$, $\Delta y$ and $\Delta z$ is the three-dimensional displacement, $(x_p, y_p)$ is the peak point coordinate, a is the camera pixel size, m is the magnification, $\theta$ is half of the objective aperture angle, d is the fitting diameter and s is "+1" or "−1" according a defocusing direction and a Z-axis direction of the microscopic thermoreflectance thermography device.

Figure 4:
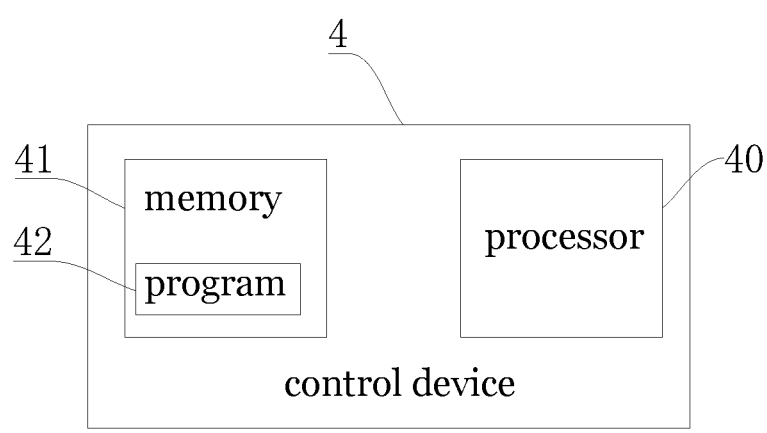
FIG. 4 is a schematic diagram of the composition of the control device according to embodiments of the present application.

An embodiment of the present application provides a control device capable of implementing three-dimensional displacement compensation methods provided by the method embodiments. As shown in FIG. 4, the control device 4 includes a non-transitory memory 41 storing a computer executable program 42 and a processor 4o to execute the program 42. When the processor 4o executes the program 42, the steps in the above-mentioned embodiments of the three-dimensional displacement compensation method, for example, steps 201 to 205 shown in FIG. 2, are implemented. Alternatively, when the processor 40 executes the program 42, the functions of the modules in each of the foregoing compensating device embodiments, such as the functions of the modules 31 to 34 shown in FIG. 3.

Exemplarily, the program 42 may be divided into one or more modules/units, and the one or more modules/units are stored in the memory 41 and executed by the processor 40 to implement the present application. The one or more modules/units may be a series of computer program instruction segments capable of performing specific functions, and the instruction segments are used to describe the execution process of the program 42 in the control device 4. For example, the program 42 can be divided into modules 31 to 34 shown in FIG. 3.

The control device 4 may be a computing device such as a desktop computer, a notebook, a handheld computer, and a cloud server. The control device 4 may include, but is not limited to, a processor 40 and a memory 41. Those skilled in the art can understand that FIG. 4 is only an example of the control device 4, and does not constitute a limitation on the control device 4. The control device 4 may include more or less components than shown, or some components may be combined, or different components, for example, the control device 4 may also include input and output devices, network access devices, buses, and the like.

The processor 40 may be a central processing unit (CPU), and may also be other general-purpose processors, digital signal processors (DSP), application specific integrated circuits (ASIC), Field-Programmable Gate Array (FPGA) or other programmable logic devices, discrete gate or transistor logic devices, discrete hardware components, etc. The general-purpose processor may be a microprocessor or any conventional processor or the like.

The memory 41 may be an internal storage unit of the control device 4, such as a hard disk or a memory of the control device 4. The memory 41 may also be an external storage device of the control device 4, such as a plug-in hard disk, a smart memory card (SMC), a secure digital card (SD) equipped on the control device 4, flash card, etc. Further, the memory 41 may also include both an internal storage unit of the control device 4 and an external storage device. The memory 41 is used to store the computer program and other programs and data required by the control device. The memory 41 can also be used to temporarily store data that has been output or will be output.

An embodiment of the present application provides a microscopic thermoreflectance thermography system capable of implementing three-dimensional displacement compensation methods provided by the method embodiments. As shown in FIG. 1, the system includes a microscopic thermoreflectance thermography device and a displacement platform 30 composed of a control device 10, a support platform 21 and an optical system 22.

The control device 10 is electrically connected to the microscopic thermoreflectance thermography device and the displacement platform 30 respectively.

The microscopic thermoreflectance thermography device is used to collect current images of the measured element when the measured element is located at the position to be compensated, and to collect the reference image of the measured element when the measured element is located at a reference position.

The displacement platform 30 is used to place the measured element and move the measured element according to the three-dimensional displacement, so as to perform three-dimensional displacement compensation for the measured element.

Optionally, the system further includes a temperature control stage 40. The microscopic thermoreflectance thermography device includes a support platform 21 and an optical system 22.

The temperature control stage 40 is located on the displacement platform 30, and the temperature control stage 40 is electrically connected to the control device 10. The optical system 22 and the displacement platform 30 are located above the support platform 21.

The temperature control stage 40 is used for placing the measured element. The optical system 22 is used to capture the current image when the measured element is at the position to be compensated, and the reference image when the measured element is at the reference position. The support platform 21 is used to provide support for the optical system 22 and the displacement platform 30.

Compared with the prior art, since the control device 10 of the system provided in the embodiment of the present application can realize the three-dimensional displacement compensation method provided in the above-mentioned embodiments, it can also reduce the time-consuming of the displacement compensation process, and is conducive to the realization of continuous real-time horizontal displacement compensation and vertical focusing.

Those skilled in the art can clearly understand that, for the convenience and brevity of description, only the division of the above-mentioned functional units and modules is used as an example for illustration. In practical applications, the above-mentioned function allocation can be completed by different functional units and modules as required, that is, the internal structure of the device is divided into different functional units or modules to complete all or part of the functions described above. Each functional unit and module in the embodiments may be integrated into one processing unit, or each unit may exist physically alone, or two or more units may be integrated into one unit. The above-mentioned integrated units may be implemented in the form of hardware, or may be implemented in the form of software functional units. In addition, the specific names of the functional units and modules are only for the convenience of distinguishing from each other, and are not used to limit the protection scope of the present application. For the specific working process of the units and modules in the above-mentioned system, reference may be made to the corresponding process in the foregoing method embodiments, which will not be repeated here.

In the above-mentioned embodiments, the description of each embodiment has its own emphasis. For parts that are not described or described in detail in a certain embodiment, reference may be made to the relevant descriptions of other embodiments.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled artisans may implement the described functionality using different methods for each particular application, but such implementations should not be considered beyond the scope of this application.

In the embodiments provided in this application, it should be understood that the disclosed apparatus/control apparatus and method may be implemented in other manners. For example, the device/control device embodiments described above are merely illustrative. For example, the division of the modules or units is only a logical function division, and there may be other division methods in actual implementation. For example, multiple units or components may be combined or may be integrated into another system, or some features may be omitted, or not implemented. On the other hand, the shown or discussed mutual coupling or direct coupling or communication connection may be through some interfaces, indirect coupling or communication connection of devices or units, and may be in electrical, mechanical or other forms.

The units described as separate parts may or may not be physically separate. A component shown as a unit may or may not be a physical unit, it may be located in one place, or it may be distributed over a number of network elements. Some or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit. The above-mentioned integrated units may be implemented in the form of hardware, or may be implemented in the form of software functional units.

The integrated modules/units, if implemented in the form of software functional units and sold or used as independent products, may be stored in a computer-readable storage medium. Based on this understanding, the present application can implement all or part of the processes in the methods of the above embodiments, and can also be completed by instructing relevant hardware through a computer program. The computer program can be stored in a computer-readable storage medium, and when executed by the processor, the computer program can implement the steps of the above-mentioned embodiments of the three-dimensional displacement compensation method for microscopic thermoreflectance thermography. Where, the computer program includes computer program code, and the computer program code may be in the form of source code, object code, executable file or some intermediate form, and the like. The computer-readable medium may include: any entity or device capable of carrying the computer program code, a recording medium, a U disk, a removable hard disk, a magnetic disk, an optical disk, a computer memory, a read-only memory (ROM), Random Access Memory (RAM), electric carrier signal, telecommunication signal and software distribution medium, etc. It should be noted that the content contained in the computer-readable media may be appropriately increased or decreased according to the requirements of legislation and patent practice in the jurisdiction, for example, in some jurisdictions, according to legislation and patent practice, the computer-readable media Excluded are electrical carrier signals and telecommunication signals.

The above-mentioned embodiments are only used to illustrate the technical solutions of the present application, but not to limit them. Although the present application has been described in detail with reference to the above-mentioned embodiments, those of ordinary skill in the art should understand that the technical solutions described in the foregoing embodiments can still be modified, or some technical features thereof can be equivalently replaced. However, these modifications or replacements do not make the essence of the corresponding technical solutions deviate from the spirit and scope of the technical solutions of the embodiments of the present application, and should be included within the protection scope of the present application.

What is claimed is:

1. A three-dimensional displacement compensation method, comprising:
   an obtaining step to obtain a current image of a measured element captured by a microscopic thermoreflectance thermography device when the measured element is located at a position to be compensated;
   a transforming step comprising: performing Fourier transform on a reference image of the measured element to obtain a first result, and performing Fourier transform on the current image of the measured element to obtain a second result, wherein the reference image is captured by the microscopic thermoreflectance thermography device when the measured element is located at a reference position, and the reference position is a position of the measured element having no position deviation;
   a first determining step to determine a peak point coordinate and a fitting diameter of a point spread function of an optical system of the microscopic thermoreflectance thermography device according to the first result and the second result;
   a first calculating step to calculate a three-dimensional displacement of the position to be compensated relative to the reference position according to the peak point coordinate, the fitting diameter and imaging parameters of the optical system; and
   a compensating step to compensate the position to be compensated of the measured element according to the three-dimensional displacement.

2. The method according to claim 1, further comprising a focusing step performed before the obtaining step, wherein the focusing step comprises manually focusing, and adjusting the measured element to the reference position that the measured element has no position deviation.

3. The method according to claim 1, further comprising a focusing step performed before the obtaining step, wherein the focusing step comprises automatically focusing, and adjusting the measured element to the reference position that the measured element has no position deviation.

4. The method according to claim 1, wherein the first result is obtained according to a formula $R(u,v)=\Im\{r(x,y)\}$, wherein $R(u,v)$ is the first result, $r(x,y)$ represents the reference image and $\Im\{\bullet\}$ represents Fourier transform.

5. The method according to claim 1, wherein the second result is obtained according to a formula $C(u,v)=\Im\{c(x,y)\}$, wherein $C(u,v)$ is the second result, $c(x,y)$ represents the current image of the measured element and $\Im\{\bullet\}$ represents Fourier transform.

6. The method according to claim 1, wherein the first determining step comprise:
   a second calculating step to obtain the point spread function of the optical system according to the first result and the second result; and
   a second determining step to determine the peak point coordinate and the fitting diameter according to the point spread function.

7. The method according to claim 6, wherein the second calculating step is performed according to $$p(x, y) = \Im^{-1}\left\{\frac{R(u, v)}{C(u, v)}\right\} \text{ or } p(x, y) = \Im^{-1}\left\{\frac{C(u, v)}{R(u, v)}\right\},$$

wherein $p(x,y)$ is the point spread function, $R(u,v)$ is the first result, and $C(u,v)$ is the second result and $\Im^{-1}\{\bullet\}$ represents inverse Fourier transform.

8. The method according to claim 7, wherein the second determining step comprises:
   performing a curve fitting to discrete points of the point spread function to obtain an analytical formula of a preset fitting objective function;
   determining unknown parameters of the analytical formula; and
   determining the peak point coordinate and the fitting diameter according to the analytical formula with the unknown parameters being determined.

9. The method according to claim 8, wherein the point spread function represents an Airy disk, and the analytical formula represents an intensity profile of the Airy disk.

10. The method according to claim 1, wherein the imaging parameters comprise a camera pixel size, a magnification and an objective aperture angle.

11. The method according to claim 10, wherein the first calculating step to calculate is performed according to a formula:

$$\begin{cases} \Delta x = \dfrac{a}{m} x_p \\ \Delta y = \dfrac{a}{m} y_p \\ \Delta z = s\dfrac{da}{2m\tan\theta} \end{cases},$$

wherein $\Delta x$, $\Delta y$ and $\Delta z$ is the three-dimensional displacement, $(x_p, y_p)$ is the peak point coordinate, a is the camera pixel size, m is the magnification, θ is half of the objective aperture angle, d is the fitting diameter, and s is "+1" or "−1" according a defocusing direction and a Z-axis direction of the microscopic thermoreflectance thermography device.

12. The method according to claim 1, wherein the compensating step compensates the position to be compensated by controlling a displacement platform of the microscopic thermoreflectance thermography device through a proportional-integral-derivative control method according to the three-dimensional displacement.

13. A control device comprising:
a non-transitory memory storing a computer executable program; and
a processor, configured to execute the program to implement a three-dimensional displacement compensation method, wherein the method comprises:
an obtaining step to obtain a current image of a measured element captured by a microscopic thermoreflectance thermography device when the measured element is located at a position to be compensated;
a transforming step comprising: performing Fourier transform on a reference image of the measured element to obtain a first result, and performing Fourier transform on the current image of the measured element to obtain a second result, wherein the reference image is captured by the microscopic thermoreflectance thermography device when the measured element is located at a reference position, and the reference position is a position of the measured element having no position deviation;
a first determining step to determine a peak point coordinate and a fitting diameter of a point spread function of an optical system of the microscopic thermoreflectance thermography device according to the first result and the second result;
a first calculating step to calculate a three-dimensional displacement of the position to be compensated relative to the reference position according to the peak point coordinate, the fitting diameter and imaging parameters of the optical system; and
a compensating step to compensate the position to be compensated of the measured element according to the three-dimensional displacement.

14. A microscopic thermoreflectance thermography system comprising:
a control device, wherein the control device comprises:
a non-transitory memory storing a computer executable program; and
a processor configured to execute the program to implement a three-dimensional displacement compensation method, wherein the method comprises:
an obtaining step to obtain a current image of a measured element captured by a microscopic thermoreflectance thermography device when the measured element is located at a position to be compensated;
a transforming step comprising: performing Fourier transform on a reference image of the measured element to obtain a first result, and performing Fourier the current image of the measured element to obtain a second result, wherein the reference image is captured by the microscopic thermoreflectance thermography device when the measured element is located at a reference position, and the reference position is a position of the measured element having no position deviation;
a first determining step to determine a peak point coordinate and a fitting diameter of a point spread function of an optical system of the microscopic thermoreflectance thermography device according to the first result and the second result;
a first calculating step to calculate a three-dimensional displacement of the position to be compensated relative to the reference position according to the peak point coordinate, the fitting diameter and imaging parameters of the optical system; and
a compensating step to compensate the position to be compensated of the measured element according to the three-dimensional displacement;
a microscopic thermoreflectance thermography device; and
a displacement platform; and
wherein
the control device is respectively electrically connected to the microscopic thermoreflectance thermography device and the displacement platform;
the microscopic thermoreflectance thermography device is used to collect current images of the measured element when the measured element is located at the position to be compensated, and to collect the reference image of the measured element when the measured element is located at the reference position; and
the displacement platform is used to place the measured element and move the measured element according to the three-dimensional displacement obtained by the control device executing the program, thereby performing a three-dimensional displacement compensation on the measured element.

15. The system according to claim 14, wherein the displacement platform is a three-axis nano platform.

16. The system according to claim 14, further comprising a temperature control stage for placing the measured element, wherein the temperature control stage is arranged on the displacement platform, and the temperature control stage is electrically connected to the control device.

17. The system according to claim 16, wherein the microscopic thermoreflectance thermography device comprises a support platform and an optical system, and wherein:
the optical system is used to collect the current images when the measured element is located at the position to be compensated, and to collect the reference image when the measured element is located at the reference position; and
the optical system and the displacement platform are supported by the support platform.

18. The system according to claim 16, wherein the temperature control stage is a heating and freezing microscope stage.

* * * * *